United States Patent
Ichimi

(10) Patent No.: US 9,313,347 B2
(45) Date of Patent: Apr. 12, 2016

(54) IMAGE PROCESSING APPARATUS, CONTROL METHOD THEREFOR AND STORAGE MEDIUM

(75) Inventor: Hideshi Ichimi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 605 days.

(21) Appl. No.: 13/585,327

(22) Filed: Aug. 14, 2012

(65) Prior Publication Data

US 2013/0055067 A1    Feb. 28, 2013

(30) Foreign Application Priority Data

Aug. 31, 2011    (JP) ................................. 2011-189323

(51) Int. Cl.
| | | |
|---|---|---|
| G06F 17/00 | (2006.01) | |
| H04N 1/00 | (2006.01) | |
| G06F 17/30 | (2006.01) | |
| G06F 17/22 | (2006.01) | |

(52) U.S. Cl.
CPC ........ *H04N 1/00464* (2013.01); *G06F 17/2247* (2013.01); *G06F 17/30884* (2013.01); *G06F 17/30899* (2013.01); *H04N 1/00217* (2013.01); *H04N 1/00225* (2013.01)

(58) Field of Classification Search
CPC .......... G06F 17/30884; G06F 17/2247; G06F 17/30899
See application file for complete search history.

(56) References Cited

U.S. PATENT DOCUMENTS

| | | | |
|---|---|---|---|
| 6,037,934 A * | 3/2000 | Himmel et al. ............... | 715/760 |
| 6,526,424 B2 * | 2/2003 | Kanno et al. .................. | 715/229 |
| 7,047,201 B2 * | 5/2006 | Chang .......................... | 704/503 |
| 7,251,604 B1 * | 7/2007 | Thenthiruperai .......... | 704/270.1 |
| 7,257,598 B2 * | 8/2007 | Toivonen et al. | |
| 7,313,525 B1 * | 12/2007 | Packingham et al. ......... | 704/270 |
| 8,433,995 B1 * | 4/2013 | Karam .......................... | 715/206 |
| 2004/0223737 A1 * | 11/2004 | Johnson ......................... | 386/68 |
| 2005/0114897 A1 * | 5/2005 | Cho et al. ....................... | 725/88 |

(Continued)

FOREIGN PATENT DOCUMENTS

| | | |
|---|---|---|
| JP | 2009-054188 A | 3/2009 |
| JP | 2010-128991 A | 6/2010 |

OTHER PUBLICATIONS

Hayashi, "15 recommended add-ons carefully selected by PCJ—A super usable Firefox 3 add-on guide", PC Japan Jun. 2009, Japan, Softbank Creative Corp, Jun. 1, 2009, vol. 14, No. 6, 147th issue, pp. 76-85.

(Continued)

*Primary Examiner* — Chau Nguyen
*Assistant Examiner* — James H Blackwell
(74) *Attorney, Agent, or Firm* — Carter, DeLuca, Farrell & Schmidt, LLP

(57) ABSTRACT

An image processing apparatus registers an acquisition destination of content to be displayed on a screen of a Web browser and an arbitrary name for each acquisition destination of content, and also registers title control information designating whether the arbitrary name or contents of a title tag defined for each page of acquired content is to be displayed as a title on a display screen of the content, and displays the arbitrary name or the contents defined in the title tag associated with a page of the content to be displayed in the title display area, in accordance with the registered title control information, when displaying the acquired content.

5 Claims, 10 Drawing Sheets

(56) References Cited

U.S. PATENT DOCUMENTS

| | | | |
|---|---|---|---|
| 2005/0240874 A1* | 10/2005 | Kiesekamp et al. | 715/745 |
| 2007/0106952 A1* | 5/2007 | Matas et al. | 715/764 |
| 2007/0282802 A1* | 12/2007 | Wilhelm | 707/3 |
| 2008/0010286 A1* | 1/2008 | Zhang et al. | 707/10 |
| 2008/0134067 A1* | 6/2008 | Best et al. | 715/765 |
| 2014/0012809 A1* | 1/2014 | Wang | 707/610 |

OTHER PUBLICATIONS

Yamato et al., "Get your hands on a really easy-to-use web browser environment that suits you—Web browser environment enhancement techniques", PC Japan Sep. 2006, Japan, Softbank Creative Corp, Sep. 1, 2006, vol. 11, No. 9, 114th issue, pp. 92-101.

Japanese Office Action issued in corresponding application No. 2011-189323 on Jul. 3, 2015.

* cited by examiner

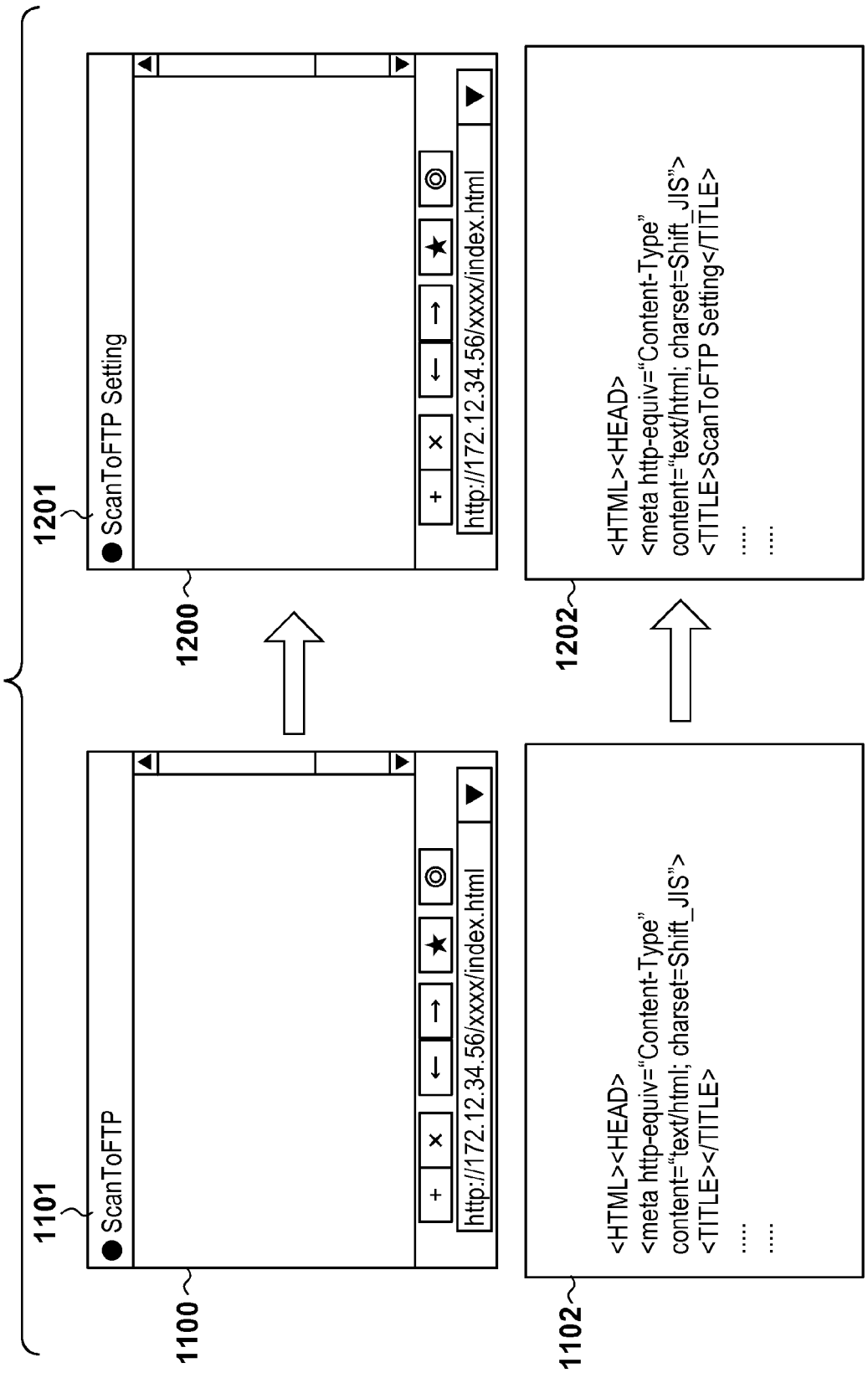

IMAGE PROCESSING APPARATUS, CONTROL METHOD THEREFOR AND STORAGE MEDIUM

BACKGROUND OF THE INVENTION

1. Field of the Invention

The present invention relates to an image processing apparatus having a Web browser function, a control method therefor, and a storage medium.

2. Description of the Related Art

In the case of displaying a title in a title display area of a Web browser screen, the Web browser, as a result of title tags being described according to HTML description rules, commonly interprets the description in the title tags and displays title contents. A user who uses the Web browser naturally judges that this displayed title represents the actual content being displayed. Thus the title information on the Web browser screen is important information indicating information on individual content.

A mechanism for dynamically changing titles is proposed in Japanese Patent Laid-Open No. 2009-54188 (hereinafter, Patent Document 1). As a result of this function, HTML tags described for each page can be displayed and titles can be dynamically displayed whenever the screen transitions, enabling information that is more useful to the user to be displayed.

However, the following problems exist with the conventional technology. For example, in the case of performing display based on title tags described in HTML such as in Patent Document 1, while it is possible to display meaningful titles for each page, describing optimal titles for all pages with a Web application having a large number of screens is troublesome. Also, in the case where the HTML description for each page contains no title tag or a title tag has no contents, there is also a means of displaying only the URL of the display content as the title, which could possibly strike the user as being odd. There is also a function for always displaying favorite names, which are arbitrary names registered by a user, in the title area rather than displaying the contents of title tags described for each page, in the case where specific pages are registered as favorites in the Web browser.

SUMMARY OF THE INVENTION

The present invention enables realization of an image processing apparatus having a Web browser function and capable of selecting between a display based on an HTML title tag and a display based on a favorite name registered in the Web browser, with regard to contents to be displayed in a title area of a Web browser screen, a control method therefor and a storage medium.

One aspect of the present invention provides an image processing apparatus having a Web browser function, comprising: a registration unit that registers an acquisition destination of content to be displayed on a screen of the Web browser and an arbitrary name for each acquisition destination of content, and registers title control information designating whether the arbitrary name or contents of a title tag defined for each page of acquired content is to be to displayed as a title on a display screen of the content; a selection unit that selects an acquisition destination of content to be displayed on the screen of the Web browser, from the acquisition destinations of a plurality of content registered by the registration unit; an acquisition unit that acquires content from the acquisition destination of content selected by selection unit; and a display control unit that displays the content acquired by the acquisition unit, and, in a case where the title control information registered together with the acquisition destination of the content designates the arbitrary name, displays the registered arbitrary name in a title display area of the screen of the Web browser, and, in a case where the title control information designates the contents of the title tag, displays the contents defined in the title tag associated with a page to be displayed from the acquired content in the title display area.

Another aspect of the present invention provides a control method for an image processing apparatus having a Web browser function, comprising: a registration unit registering an acquisition destination of content to be displayed on a screen of the Web browser and an arbitrary name for each acquisition destination of content, and registering title control information designating whether the arbitrary name or contents of a title tag defined for each page of acquired content is to be to displayed as a title on a display screen of the content; a selection unit selecting an acquisition destination of content to be displayed on the screen of the Web browser, from the registered acquisition destinations of a plurality of content; an acquisition unit acquiring content from the selected acquisition destination of content; and a display control unit displaying the acquired content, and, in a case where the title control information registered together with the acquisition destination of the content designates the arbitrary name, displaying the registered arbitrary name in a title display area of the screen of the Web browser, and, in a case where the title control information designates the contents of the title tag, displaying the contents defined in the title tag associated with a page to be displayed from the acquired content in the title display area.

Still another aspect of the present invention provides a computer-readable storage medium storing a computer program for causing a computer to execute the steps of the control method for the image processing apparatus.

Further features of the present invention will be apparent from the following description of exemplary embodiments with reference to the attached drawings.

BRIEF DESCRIPTION OF THE DRAWINGS

FIG. 10 is a diagram showing exemplary display when there is a screen transition according to one embodiment

DESCRIPTION OF THE EMBODIMENTS

Figure 1:
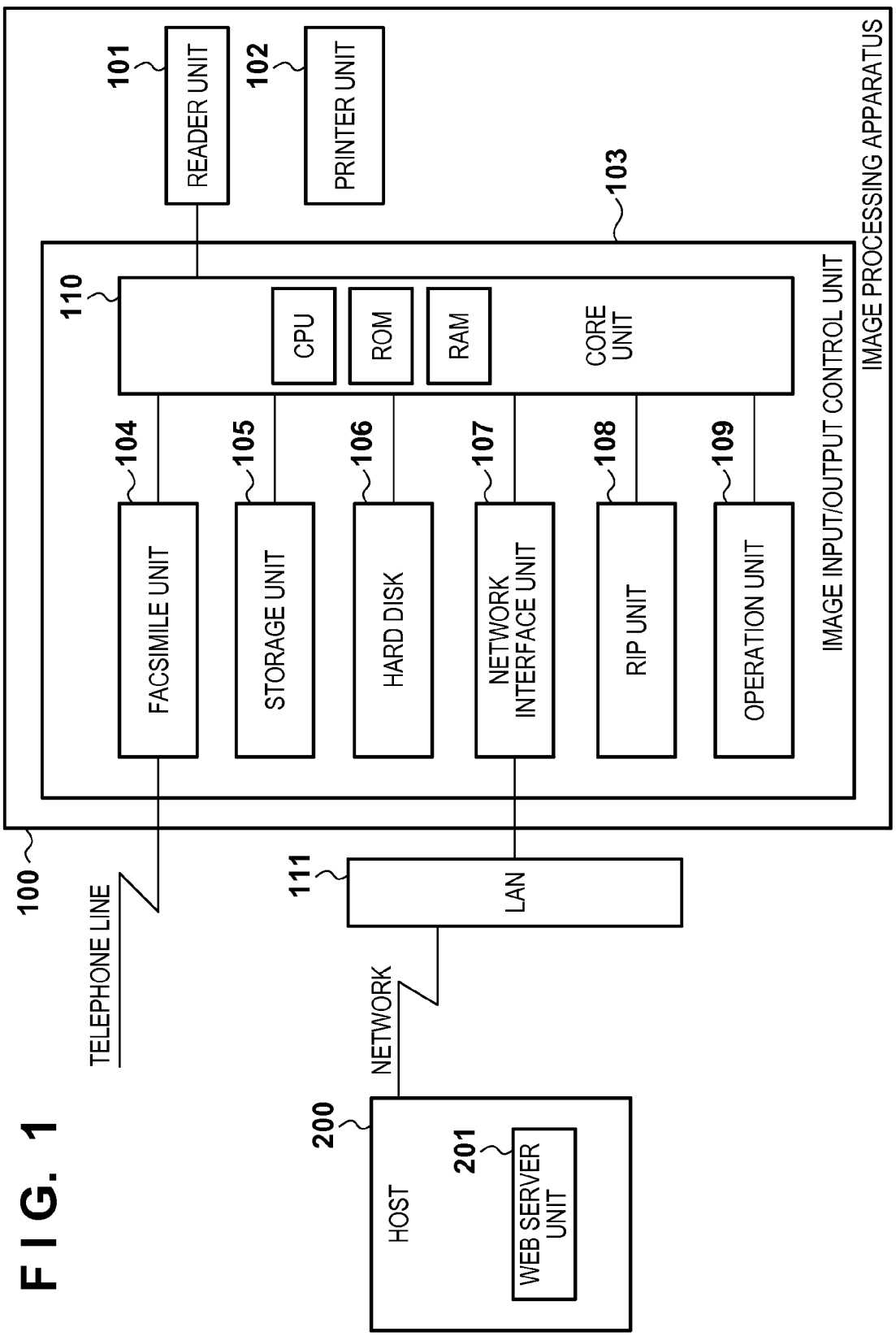
FIG. 1 is a block diagram showing an exemplary configuration of an image processing system including an image processing apparatus according to one embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of Image Processing Apparatus>

Hereinafter, one embodiment of the present invention will be described, with reference to FIG. 1 to FIG. 10. First, configurations of an image processing apparatus and an image processing system including the image processing apparatus will be described, with reference to FIG. 1. In the image processing system according to the present embodiment, an image processing apparatus 100 and a host 200 are connected via a LAN 111. This image processing apparatus 100 has a Web browser function. Also, the host 200 functions as a Web server.

The image processing apparatus 100 is provided with a reader unit 101, a printer unit 102, and an image input/output control unit 103. The reader unit 101 reads an image of an original, and outputs image data that depends on the image of the original to the image input/output control unit 103. The printer unit 102 records an image on a recording sheet according to image data output from the image input/output control unit 103.

The image input/output control unit 103 is connected to the reader unit 101 and the printer unit 102, and is provided with a facsimile unit 104, a storage unit 105, a network interface unit 107, a RIP unit 108, an operation unit 109, and a core unit 110. The host 200 incorporates a Web server unit 201, and can be accessed from the operation unit 109 via the LAN 111. The Web server unit 201 is incorporated in the host 200, and returns response contents to the request source in response to a request for a Web page through the LAN 111.

The facsimile unit 104 decompresses compressed image data received via a telephone line and transfers the decompressed image data to the core unit 110, and compresses image data transferred from the core unit 110 and transmits the compressed image data via the telephone line. Image data that is transmitted and received can be temporarily saved in a hard disk 106 connected to the storage unit 105.

The storage unit 105 compresses image data transferred from the core unit 110, and stores the image data in the hard disk 106 together with an ID number for retrieving that image data. Also, the storage unit 105 retrieves compressed image data stored in the hard disk 106 based on code data transferred via the core unit 110, read outs and decompresses the compressed image data that is retrieved, and transfers the decompressed image data to the core unit 110.

The network interface unit 107 is an interface between the LAN 111 and the core unit 110. The RIP unit 108 expands code data (PDL) transferred from the LAN 111 into image data that can be recorded by the printer unit 102. The operation unit 109 is provided with a touch panel display and hard keys, and gives operation instructions to this image processing apparatus, configures operation settings, and the like using a user interface. Applications include functions such as copy, print, send (document transmission), box (document save), and a Web browser.

The core unit 110 controls the flow of data to and from the reader unit 101, the printer unit 102, the facsimile unit 104, the storage unit 105, the network interface unit 107, the RIP unit 108, and the operation unit 109. The core unit 110 is provided with a CPU, a ROM, a RAM, and the like. The CPU performs overall control of the entire apparatus by executing a program stored in the ROM on the RAM.

<Basic Screen>

Figure 2:
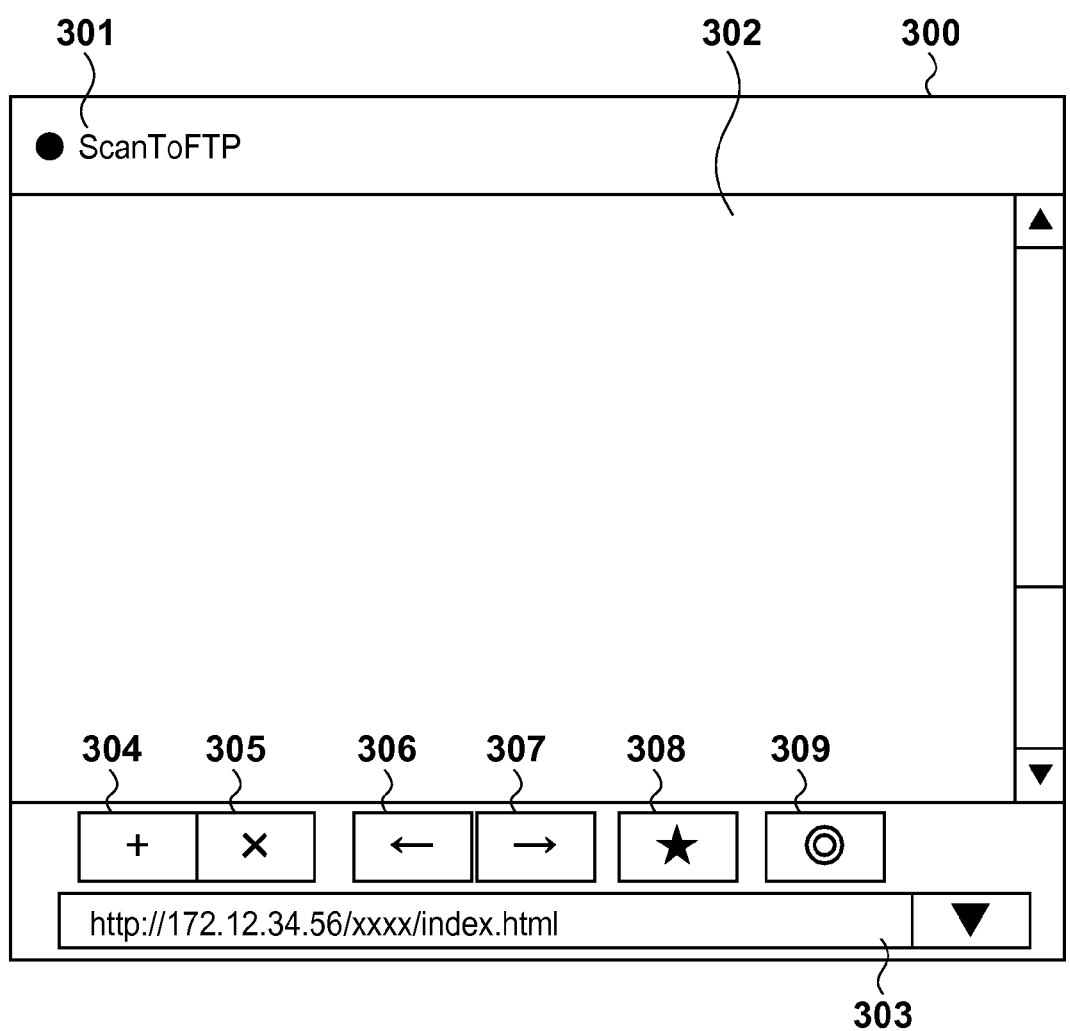
FIG. 2 is a diagram showing a Web browser screen according to one embodiment.

Next, a basic screen of the Web browser that operates on the operation unit 109 of the image processing apparatus will be described, with reference to FIG. 2. As shown in FIG. 2, a Web browser screen 300 is displayed on the operation unit 109, and display is controlled by the core unit 110 including the CPU. Content of a Web page transmitted from the Web server unit 201 as a result of communication with the Web server unit 201 through the network interface unit 107 and the LAN 111 is displayed on the Web browser screen 300 displayed on the operation unit 109.

The Web browser screen 300 has a title display area 301 and a content display area 302, and respectively reflects page contents input in a URL input area 303 and called, or the contents of favorite pages which will be discussed later. Reference numerals 304 to 309 are function buttons of the Web browser screen 300. A button 304 is a button for opening a new tab page. A button 305 is a button for closing a selected tab page. A button 306 is a button for returning content being display to the previous page. A button 307 is a button for advancing content being display to the next page. A button 308 is a button for displaying a favorites screen. A button 309 is a button for opening a Web browser settings screen.

<Registration Screen>

Next, a favorites registration screen that is transitioned to after the favorites button 308 is pressed on the Web browser screen 300 shown in FIG. 2 will be described, with reference to FIG. 3. Here, a favorite denotes content to be displayed on the Web browser screen that is desired by an operator. The operator can register an acquisition destination for acquiring the content of a favorite. A name input portion 401 of a favorites registration dialog 400 enables a name of a favorite to be arbitrarily input. A URL input portion 402 enables a URL to be registered in Favorites to be arbitrary input. Note that the title and URL of the page displayed immediately before are automatically reflected in the name input portion 401 and the URL input portion 402 at the timing at which the favorites registration dialog 400 is displayed.

A title display control portion 403 is a check box for selecting the display contents to be displayed in the title display area 301. Here, when "Display name of favorite as title" has been selected, the name input to the name input portion 401 is displayed in the title display area 301. On the other hand, when "Display title of content" has been selected, the contents of a title tag described in HTML for each page of the site registered in Favorites is displayed each time.

<Registration Processing>

Next, the processing procedure at the time of registering a favorite via the Web browser screen in FIG. 3 will be described, with reference to FIG. 4. Note that the processing described below is realized by the CPU of the core unit 110 executing a program stored in the ROM on the RAM.

First, in S100, the CPU determines whether the information selected in the title display control portion 403 of the Web browser screen 300 is favorite name or contents of title tag. If, as a result of the determination, a favorite name is to be displayed, the processing proceeds to S101, where the CPU sets an identifier "Favorite Name" for displaying a favorite name, and proceeds to S103. On the other hand, if it is determined that the contents of a title tag is to be displayed, the processing proceeds to S102, where the CPU sets an identifier "contents of title tag" for performing display using the title tag associated with each page of content, and proceeds to S103. Note that the above identifiers are exemplary title control information.

In S103, the CPU sets the contents input in the name input portion 401, that is, a favorite name, and sets the contents input in the URL input portion 402 at S104. Subsequently, in S105, the CPU registers the contents set at S101 to S104, and ends the favorite registration processing. Here, registration denotes the process of storing favorite information in the hard disk 106, for example.

<Favorite Information>

Next, favorite information registered at S105 and held in the Web browser will be described, with reference to FIG. 5. The favorite information represents information registered by executing the processing shown in the favorite registration flowchart of FIG. 4. Web browser favorite information 500 is held in the hard disk 106, for example, as favorite information of the Web browser. Favorite information is held for every plurality of items such as shown by reference numeral 501 for at least one favorite.

Specifically, favorite information includes "Favorite No", "Favorite Name", "URL", and "Title Identifier" (title control information). "Favorite No" indicates sequential numbers automatically given at the time of favorite registration. "Favorite Name" indicates the contents input in the name input portion 401 in FIG. 3. "Favorite URL" indicates the contents input in the URL input portion 402 in FIG. 3. "Title Identifier" indicates the contents selected in the title display control portion 403 in FIG. 3 and set at S101 or S102 of the flowchart in FIG. 4. In other words, "Favorite Name" is designated in the case of displaying the favorite name in the title area of the content display screen and "Title Tag" is designated in the case of displaying the contents of the title tag in the title area. Favorite information such as the above is collated and held as shown by favorite information 502 and 503.

<Favorite List Screen>

Figure 6:
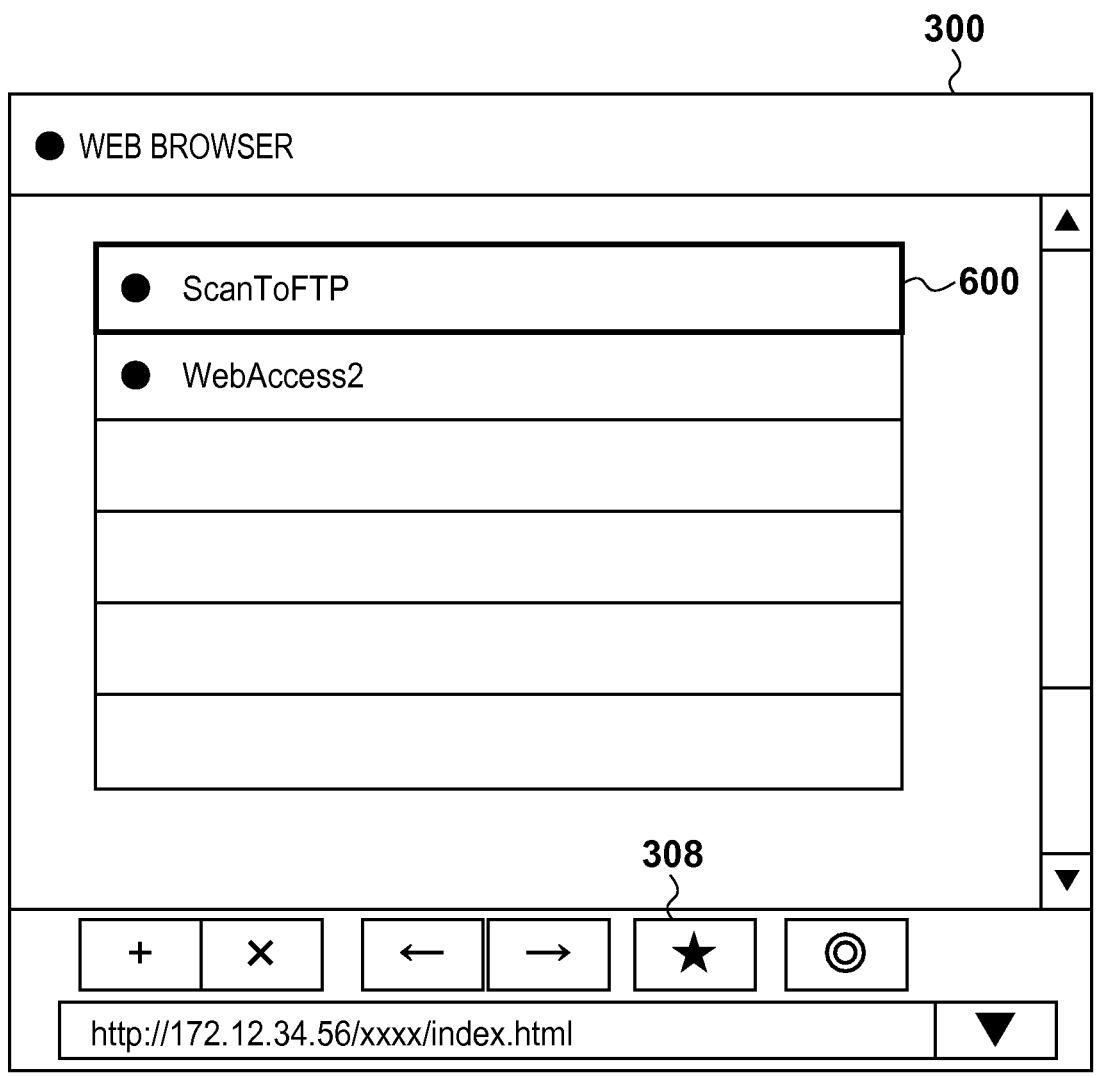
FIG. 6 is a diagram showing an exemplary list screen after registering a favorite item according to one embodiment.

Next, a favorite list screen (selection screen) transitioned to after the favorites button 308 is pressed on the Web browser screen 300 will be described, with reference to FIG. 6. The CPU acquires registration information, that is, favorite information, stored in the hard disk 106 at S105, and displays a list thereof on the Web browser screen 300. As shown in FIG. 6, names registered in the favorite registration flow of FIG. 4 are displayed in a favorite list dialog 600 and when one of these displayed names is selected, the designated URL is acquired and a page is displayed.

<Display Processing>

Figure 7:
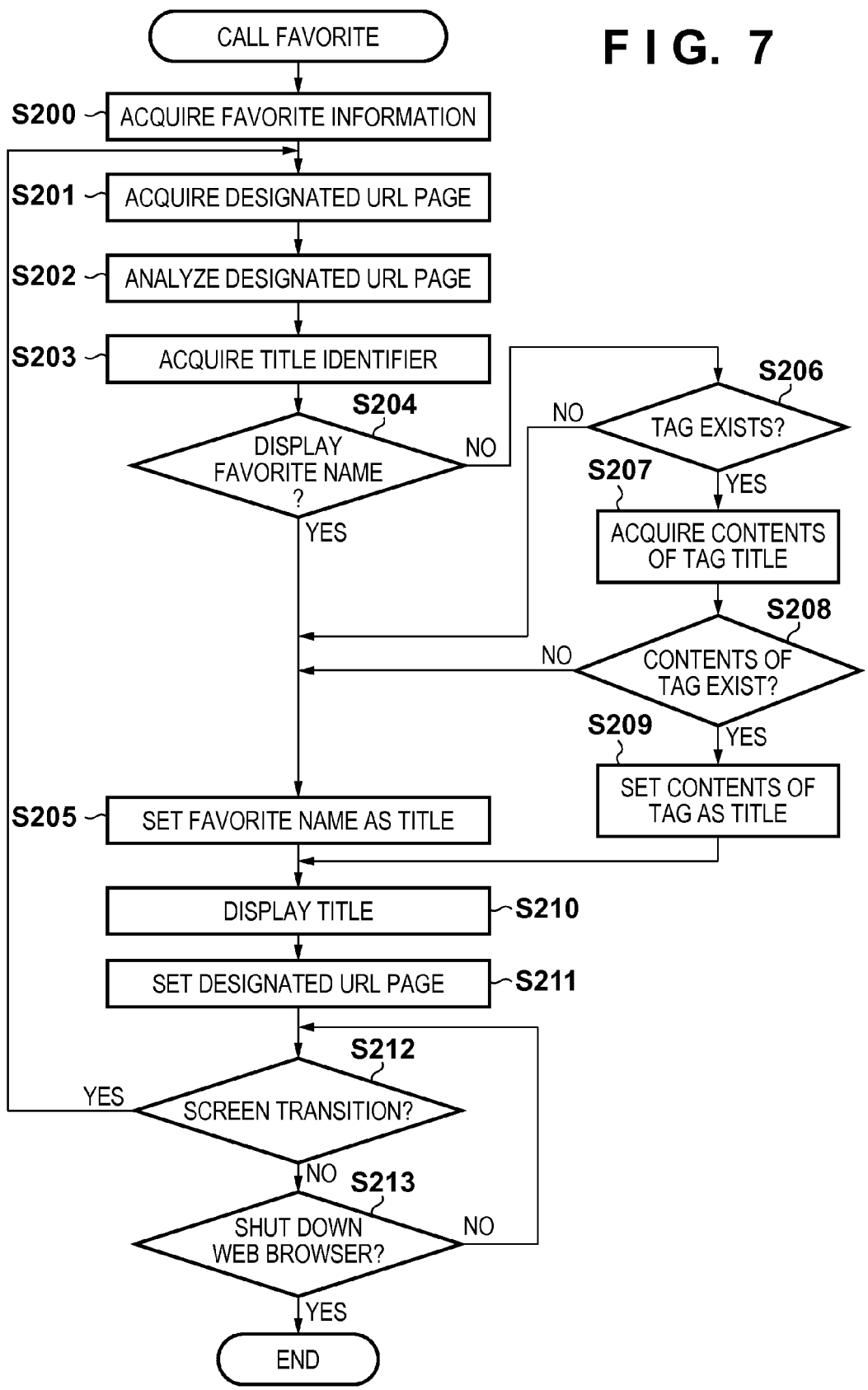
FIG. 7 is a flowchart for controlling title display when there is a screen transition according to one embodiment.

Next, display processing in the case where a favorite page has been called from the favorite list dialog 600 shown in FIG. 6, and a user (operator) has pressed a link or a button after the favorite page has been called will be described, with reference to FIG. 7. Note that the processing described below is realized by the CPU of the core unit 110 executing a program stored in the ROM on the RAM.

When a favorite call instruction is received, the CPU, in S200, acquires information on the called favorite from the favorite information 500 stored in the hard disk 106. Subsequently, in S201, the CPU, based on a URL acquired from the favorite information, acquires the content of the designated URL, and analyzes the acquired page in S202.

Figure 3:
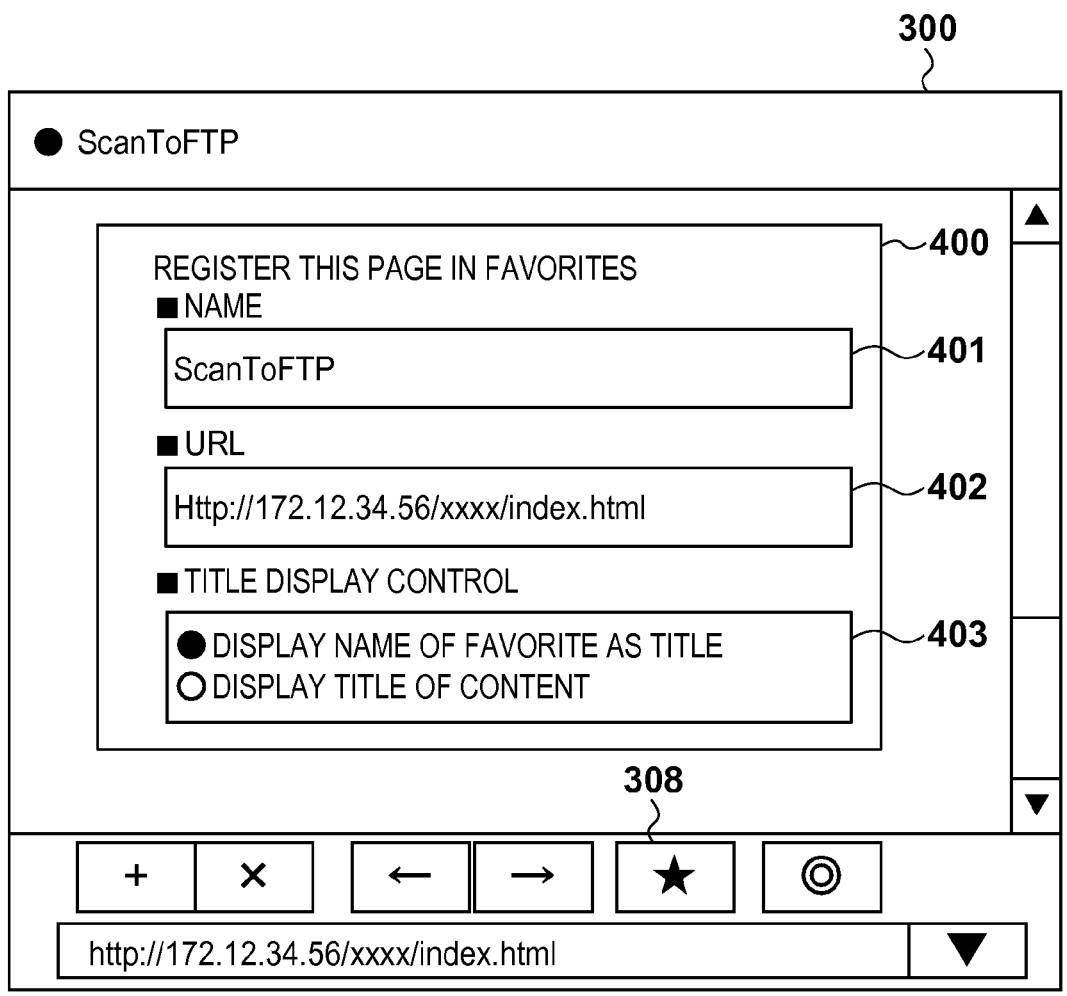
FIG. 3 is a diagram showing an exemplary screen for registering a favorite item according to one embodiment.
Figure 4:
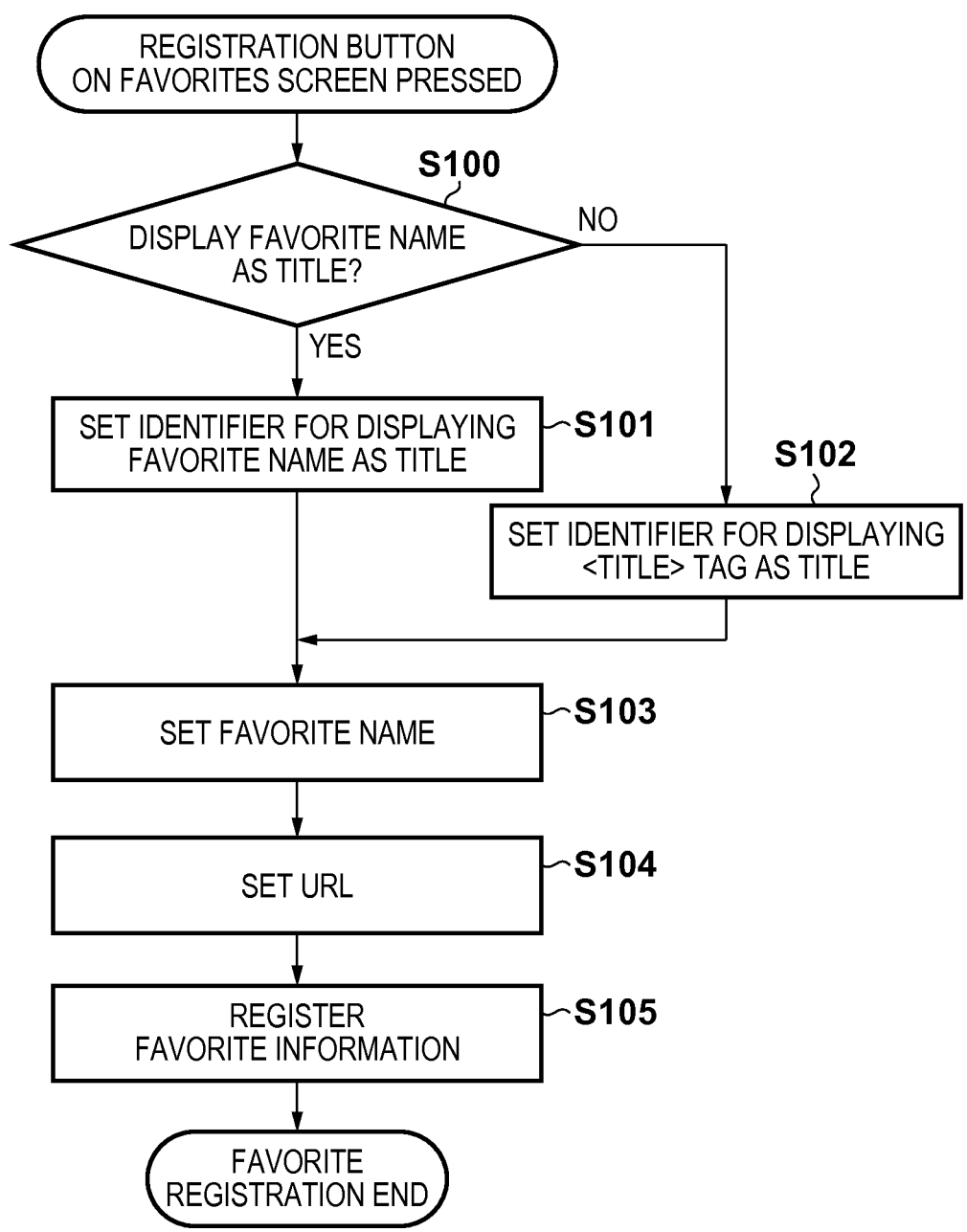
FIG. 4 is a flowchart showing processing for registering a favorite item according to one embodiment.

Next, in S203, a title display control identifier registered via the favorite registration screen shown in FIG. 3 is acquired. Subsequently, in S204, the CPU determines whether the acquired title display control identifier indicates that a favorite name is to be displayed or the name of a title tag is to be displayed. If, as a result of the determination, a favorite name is to be displayed, the processing proceeds to S205, where the CPU sets the favorite name as the title, and proceeds to S210.

On the other hand, in the case where the contents of a title tag is to be displayed, the processing proceeds to S206, where the CPU determines whether the page analyzed at S202 has a title tag. If, as a result of the determination, it is judged that there is no title tag, the processing proceeds to S205, where the CPU sets the favorite name as the title, and proceeds to S210. On the other hand, if it is determined that there is a title tag, the processing proceeds to S207, where the CPU acquires the contents of a title tag associated with the page to be displayed, and determines whether the contents of the title tag acquired at S207 is defined in S208. If, as a result of the determination, it is determined that the contents of the title tag is not defined, the processing proceeds to S205, where the CPU sets the favorite name as the title, and proceeds to S210. On the other hand, if it is determined that the contents of the title tag is defined, the processing proceeds to S209, where the CPU sets the contents of the title tag associated with the page to be displayed as the title, and proceeds to S210.

When the title has been set, the CPU, in S210, displays the set title in a title area, and displays the designated URL page at S211. Thereafter, in S212, the CPU detects whether there is a further screen transition resulting from a link or a button being pressed, after the favorite page display performed from S200. If a screen transition is detected, the processing proceeds to S201, where the CPU subsequently acquires the designated URL page and performs title display control. On the other hand, if a screen transition is not detected, the processing proceeds to S213, where the CPU determines whether the Web browser has been shut down. If the Web browser has not been shut down, the processing returns to S212, and detection of a screen transition is performed. On the other hand, when shutting down of the Web browser has been detected, the CPU ends the Web browser function.

<Screen Transition>

Figure 8:
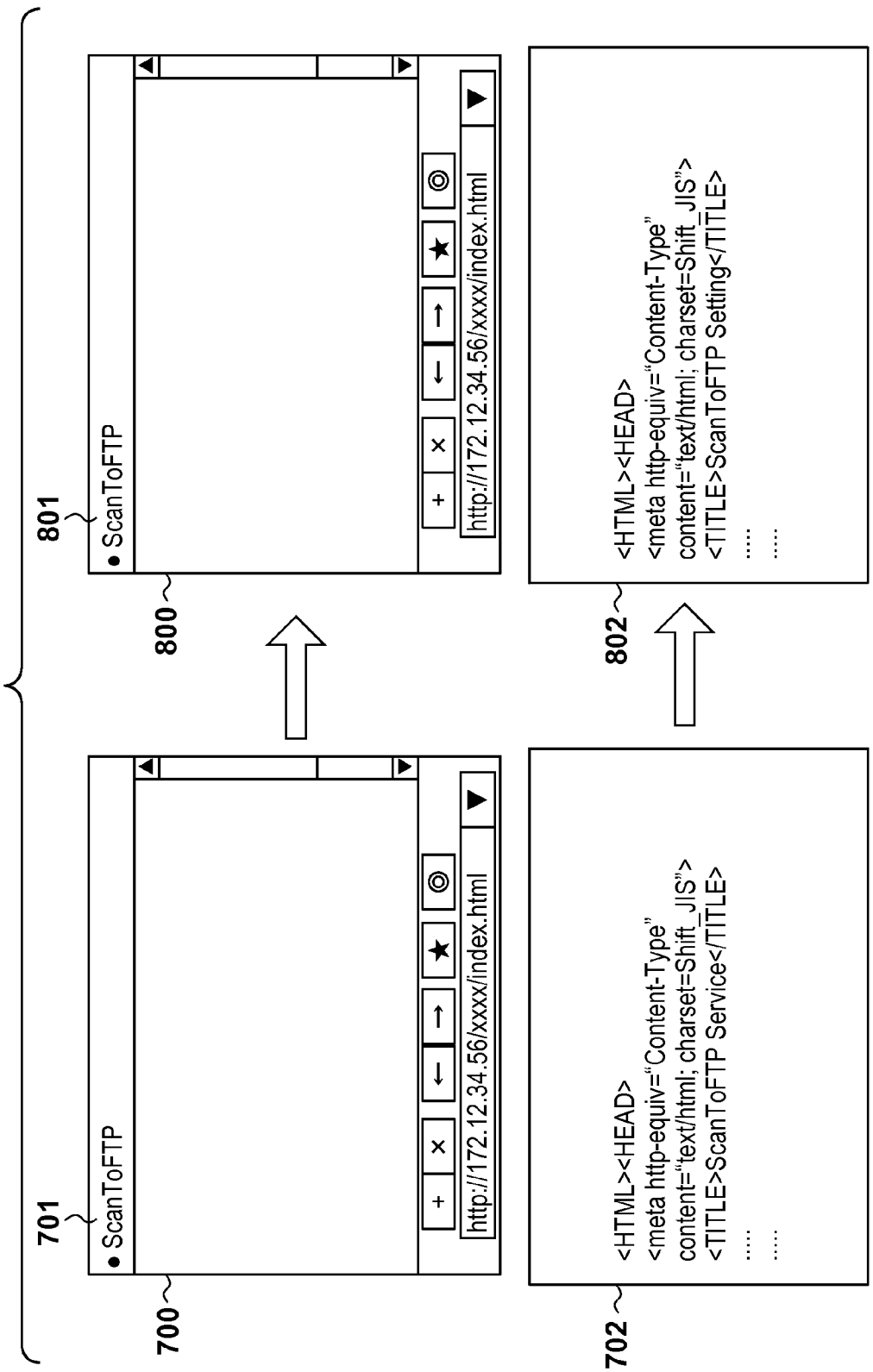
FIG. 8 is a diagram showing exemplary display when there is a screen transition according to one embodiment.

Next, screen transition will be described, with reference to FIG. 8 to FIG. 10. FIG. 8 represents screen transition in the case where the title identifier is set to "Favorite Name" in the favorite information 500 shown in FIG. 5.

A Web browser screen 700 is called from the favorite list dialog 600 in FIG. 6 and displayed in accordance with the description of content 702. Although <TITLE>ScanToFTPService</TITLE> is described in the title tag in the content description, the favorite name ScanToFTP is displayed in a title area 701. This is because the title identifier is set to "Favorite Name".

A Web browser screen 800 is displayed in accordance with the description of content 802. Although <TITLE>ScanToFTPSetting</TITLE> is described in the title tag in the content description, ScanToFTP is displayed in a title area 801. This is because the title identifier is set to "Favorite Name". Even when there is such a screen transition from the Web browser screen 700 to the Web browser screen 800, the favorite name will always be displayed in the case where the title display control settings have been configured so as to display the favorite name.

Figure 5:
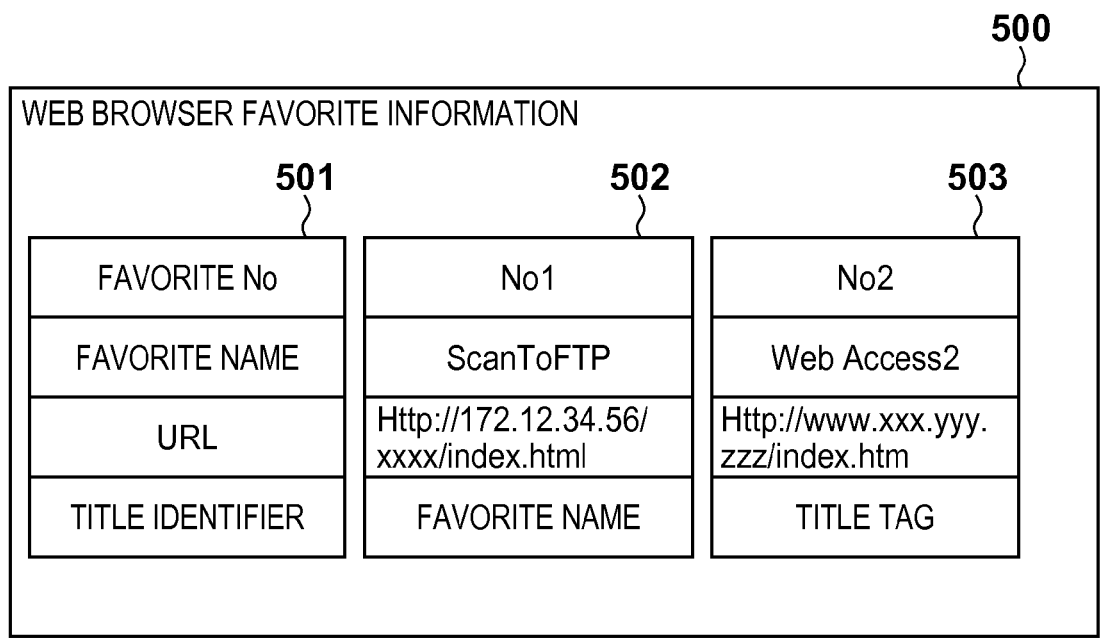
FIG. 5 is a diagram showing information after registering a favorite item according to one embodiment.
Figure 9:
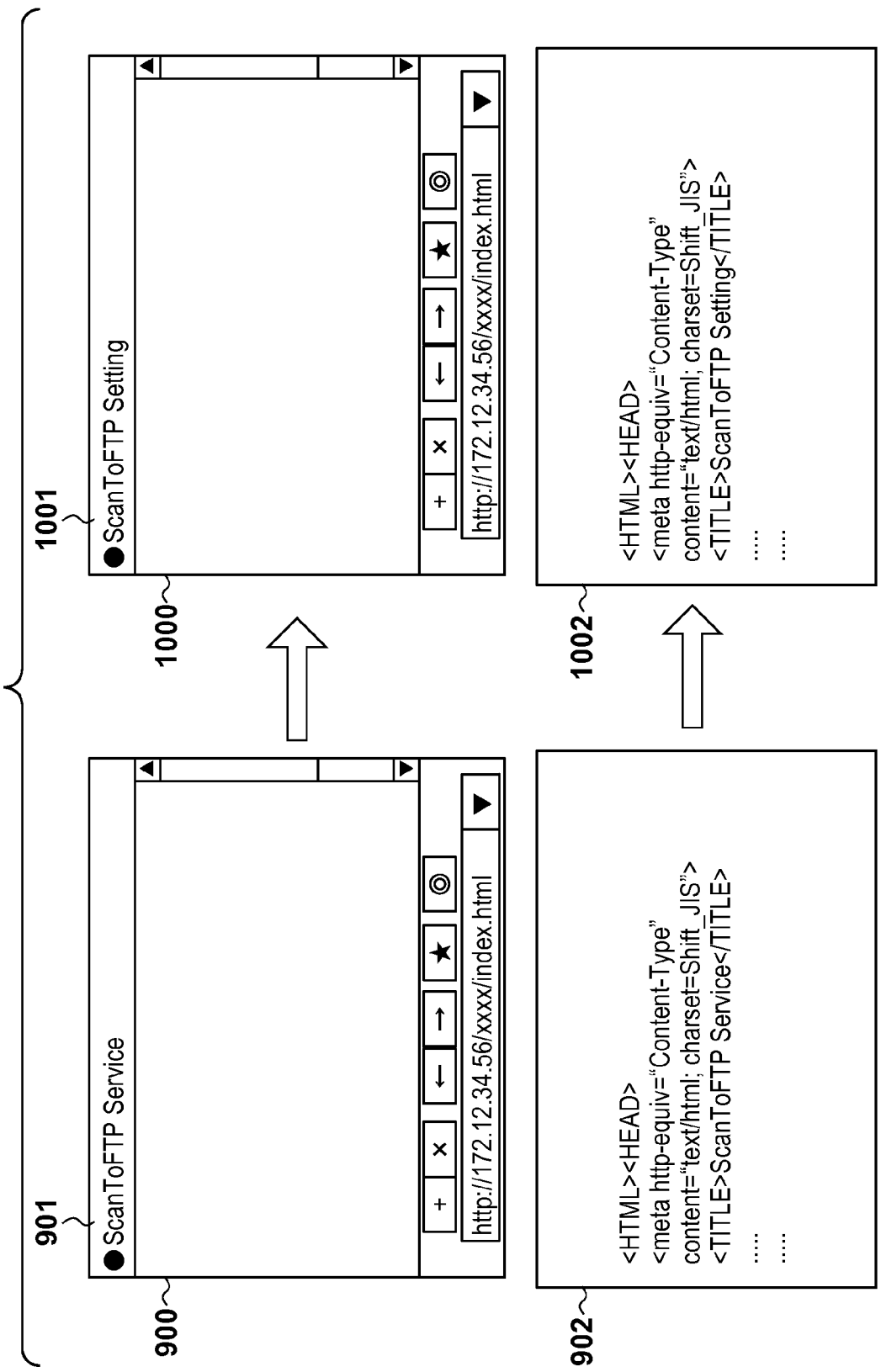
FIG. 9 is a diagram showing exemplary display when there is a screen transition according to one embodiment.

FIG. 9 represents screen transition in the case where the title identifier is set to "Title Tag" in the favorite information 500 shown in FIG. 5.

A Web browser screen 900 is called from the favorite list dialog 600 in FIG. 6 and displayed in accordance with the description of content 902. Since <TITLE>ScanToFTPService</TITLE> is described in the title tag in the content description, ScanToFTPService is displayed in a title area 901. This is because the title identifier is set to "Title Tag".

A Web browser screen 1000 is displayed in accordance with the description of content 1002. Since <TITLE>ScanToFTPSetting</TITLE> is described in the title tag in the content description, ScanToFTPSetting is displayed in a title area 1001. This is because the title identifier is set to "Title Tag". When there is such a screen transition from the Web browser screen 900 to the Web browser screen 1000, the contents of the title tag of each page is displayed since the title identifier is set to "Title Tag".

FIG. 10 represents screen transition in the case where the title identifier is set to "Title Tag" in the favorite information 500 shown in FIG. 5. However, different from FIG. 9, screen transition in the case where there is either no title tag or no contents of the title tag in S206 and S208 shown in the flowchart of FIG. 7 is represented.

A Web browser screen 1100 is called from the favorite list dialog 600 of FIG. 6 and displayed in accordance with the description of content 1102. Since the contents of the title tag are not defined in the content description, the favorite name ScanToFTP is displayed in a title area 1101. This is because the contents of the title tag are not defined, even though the title identifier is set to "Title Tag".

A Web browser screen 1200 is displayed in accordance with the description of content 1202. Since <TITLE>ScanToFTPSetting</TITLE> is described in the title tag in the content description, ScanToFTPSetting is displayed in a title area 1201.

Thus, on the Web browser screen 1100, the favorite name is displayed as the title, since there are no contents of the title tag. However, in the case where the contents of the title tag are correctly described for the page of the Web browser screen 1200, which is the screen transitioned to, the described contents of the title tag is displayed.

As described above, according to the image processing apparatus of the present embodiment, display that will not strike the user as being odd can always be performed, by configuring the settings so as to display a favorite name as the title, when favorite registration is performed on a Web browser. Also, detailed display can be provided to the user as a result of the intended title of each page always being displayed, by configuring the settings so as to display a title tag name as the title, when favorite registration is performed on a Web browser. By enabling the user to select from these title display controls at the time of favorite registration, display that is tailored to a Website, Web application or the user's circumstances can be performed.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189323 filed on Aug. 31, 2011, which is hereby incorporated by reference herein in its entirety.

What is claimed is:

1. An image processing apparatus having a Web browser function, comprising:
   a processing unit; and
   a memory coupled to the processing unit, the memory including instructions that, when executed by the processing unit, cause the processing unit to perform as:
      a registration unit that registers an acquisition destination of content to be displayed on a screen of the Web browser and a name input by a user, for acquisition destination of content, and registers title control information designating whether the name or contents of a title tag defined for a page of acquired content is to be to displayed as a title on a display screen of the content;
      a selection unit that selects an acquisition destination of content to be displayed on the screen of the Web browser, from the acquisition destinations of a plurality of content registered by the registration unit;
      an acquisition unit that acquires content from the acquisition destination of content selected by selection unit; and
      a display control unit that displays the content acquired by the acquisition unit, and, in a case where the title control information registered together with the acquisition destination of the content designates the name, displays the registered name in a title display area of the screen of the Web browser, and, in a case where the title control information designates the contents of the title tag, displays the contents defined in the title tag associated with the page to be displayed from the acquired content in the title display area,
   wherein the display control unit, in a case where the title control information designates the contents of the title tag, and the title tag associated with the page to be displayed from the acquired content is not defined, displays the name, which is registered in accordance with the user input, in the title display area.

2. The image processing apparatus according to claim 1, wherein the display control unit, in a case where the page of the acquired content is being displayed on the screen of the Web browser, and the page transitions in accordance with an operation by an operator via the screen, displays the contents defined in the title tag associated with the transitioned page.

3. The image processing apparatus according to claim 1, wherein the selection unit displays a selection screen that displays a list of the acquisition destinations of the plurality of contents registered by the registration unit, and selects an acquisition destination of content to be displayed on the screen of the Web browser, in accordance with information input by an operator via the selection screen.

4. A control method for an image processing apparatus having a Web browser function, comprising:
   registering an acquisition destination of content to be displayed on a screen of the Web browser and a name input by a user, for acquisition destination of content, and registering title control information designating whether the name or contents of a title tag defined for a page of acquired content is to be to displayed as a title on a display screen of the content;
   selecting an acquisition destination of content to be displayed on the screen of the Web browser, from the registered acquisition destinations of a plurality of content;
   acquiring content from the selected acquisition destination of content; and displaying the acquired content, and, in a case where the title control information registered together with the acquisition destination of the content designates the name, displaying the registered name in a title display area of the screen of the Web browser, and, in a case where the title control information designates the contents of the title tag, displaying the contents defined in the title tag associated with the page to be displayed from the acquired content in the title display area, wherein, in a case where the title control information designates the contents of the title tag, and the title tag associated with the page to be displayed from the acquired content is not defined, the name, which is registered in accordance with the user input, is displayed in the title display area.

5. A computer-readable non-transitory storage medium storing a computer program for causing a computer to execute a control method for an image processing apparatus, the control method comprising:

registering and acquisition destination of content to be displayed on a screen of a Web browser and a name input by a user, for acquisition destination of content, and registering title control information designating whether the name or contents of a title tag defined for a page of acquired content is to be displayed as a title on a display screen of the content;

selecting an acquisition destination of content to be displayed on the screen of the Web browser, from the registered acquisition destinations of a plurality of content;

acquiring content from the selected acquisition destination of content; and displaying the acquired content, and, in a case where the title control information registered together with the acquisition destination of the content designates the name, displaying the registered name in a title display area of the screen of the Web browser, and, in a case where the title control information designates the contents of the title tag, displaying the contents defined in the title tag associated with the page to be displayed from the acquired content in the title display area, wherein, in a case where the title control information designates the contents of the title tag, and the title tag associated with the page to be displayed from the acquired content is not defined, the name, which is registered in accordance with the user input, is displayed in the title display area.

* * * * *